United States Patent [19]
da Rosa

[11] Patent Number: 5,950,346
[45] Date of Patent: Sep. 14, 1999

[54] MULTI-SEGMENT FISHING ROD ASSEMBLY

[75] Inventor: Joaquim C. da Rosa, Kenosha, Wis.

[73] Assignee: Johnson Worldwide Associates, Sturtevant, Wis.

[21] Appl. No.: 08/927,229

[22] Filed: Sep. 10, 1997

[51] Int. Cl.[6] .......................... A01K 97/10; A01K 87/00
[52] U.S. Cl. ................................................ 43/21.2; 43/25
[58] Field of Search .............................. 43/18.1, 25, 25.2, 43/26, 21.2

[56] References Cited

U.S. PATENT DOCUMENTS

| | | | |
|---|---|---|---|
| 252,008 | 1/1882 | Andrews | 43/18.1 |
| D. 305,351 | 1/1990 | Mills | D22/134 |
| 895,372 | 8/1908 | Hostetter et al. | 43/18.1 |
| 1,893,396 | 1/1933 | Bullough | 43/18.1 |
| 2,241,183 | 5/1941 | Ceder | 43/23 |
| 2,351,734 | 6/1944 | Backe | 43/18.1 |
| 2,750,184 | 6/1956 | Warndahl | 43/25 |
| 2,822,896 | 2/1958 | Schuster | 43/18.1 |
| 2,839,865 | 6/1958 | Lubanski | 43/26 |
| 3,036,398 | 5/1962 | Gagner | 43/18.1 |
| 3,113,363 | 12/1963 | Fyvie | 43/25 |
| 3,199,243 | 8/1965 | Caston | 43/26 |
| 3,245,169 | 4/1966 | Kennel | 43/18.1 |
| 3,319,910 | 5/1967 | Collin et al. | 43/18.1 |
| 3,425,150 | 2/1969 | Braese | 43/25.2 |
| 3,508,357 | 4/1970 | Collin et al. | 43/26 |
| 3,832,796 | 9/1974 | Cardwell et al. | 43/25 |
| 3,992,799 | 11/1976 | Oakes | 43/25 |
| 4,160,607 | 7/1979 | Reichow | 43/18.1 |
| 4,265,046 | 5/1981 | Keith | 43/21.2 |
| 4,707,892 | 11/1987 | Nelson | 43/25.2 |
| 4,768,303 | 9/1988 | Baylink | 43/18.1 |
| 4,873,780 | 10/1989 | Lancette | 43/25.2 |
| 5,109,579 | 5/1992 | Engel | 43/21.2 |
| 5,421,117 | 6/1995 | Geraci et al. | 43/21.2 |
| 5,450,688 | 9/1995 | Hall | 43/26 |
| 5,586,404 | 12/1996 | Freitas | 43/21.2 |
| 5,595,014 | 1/1997 | Moore | 43/25 |
| 5,794,375 | 8/1998 | Wright | 43/25 |

Primary Examiner—Michael J. Carone
Assistant Examiner—Darren Ark
Attorney, Agent, or Firm—Foley &Lardner

[57] ABSTRACT

A fishing rod assembly includes a multi-segment rod having first and second segments and a clip for securing the segments adjacent one another during storage and transportation. The first segment includes a tip while the second segment includes a handle portion having an end opposite the tip. The handle portion preferably contains a cavity axially extending from the end towards the tip. The handle portion also preferably includes a retainer projecting from the handle portion to retain the first segment proximate the handle portion. The clip includes a first portion configured for attachment to the first segment of the rod and a pair of resiliently flexible extensions projecting from the first portion configured to grasp the second segment of the rod. In the preferred embodiment, the cavity is configured to receive the clip. A ribbon is preferably attached within the cavity to facilitate removal of the clip.

19 Claims, 3 Drawing Sheets

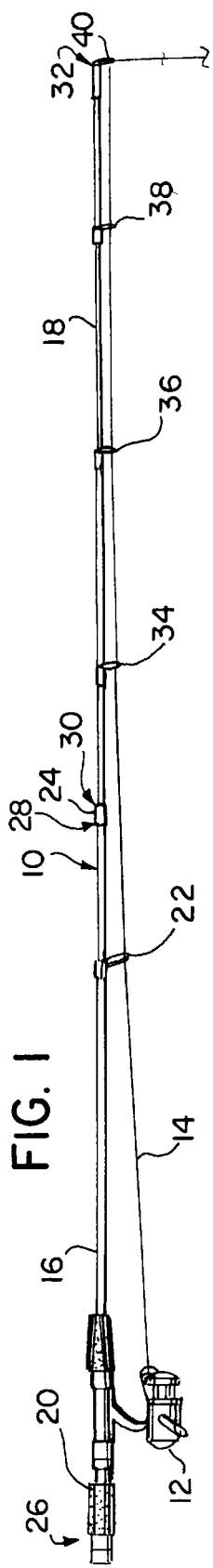
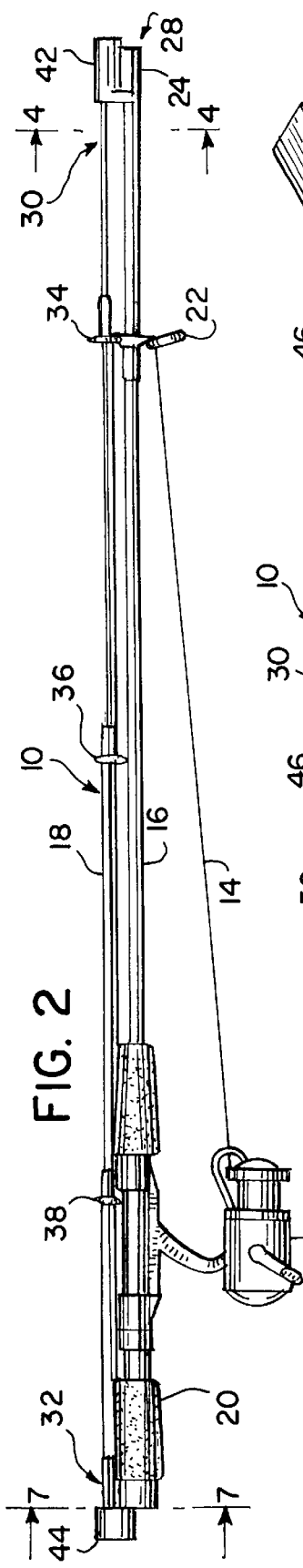
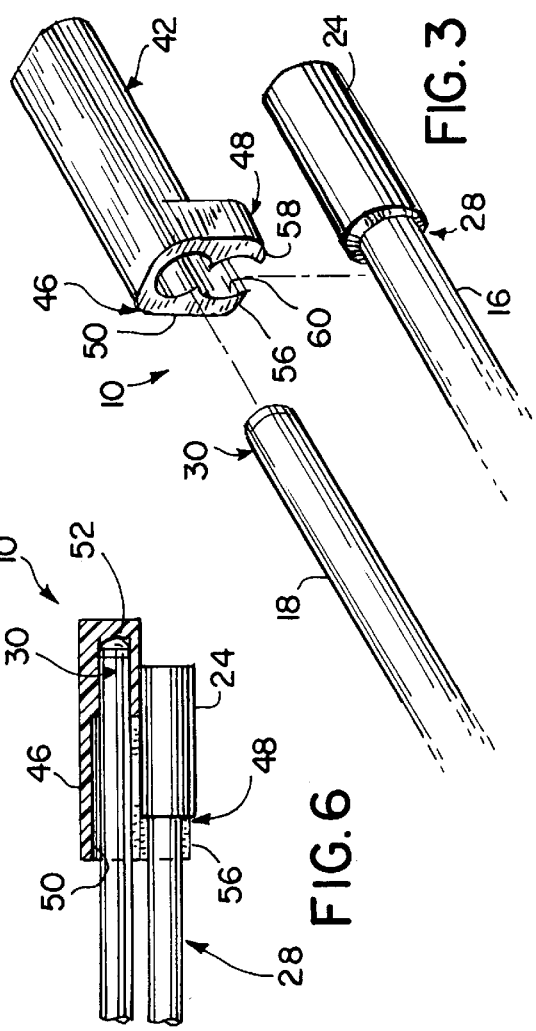
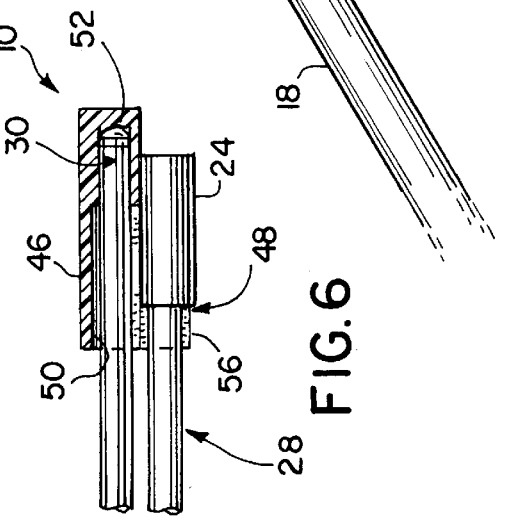
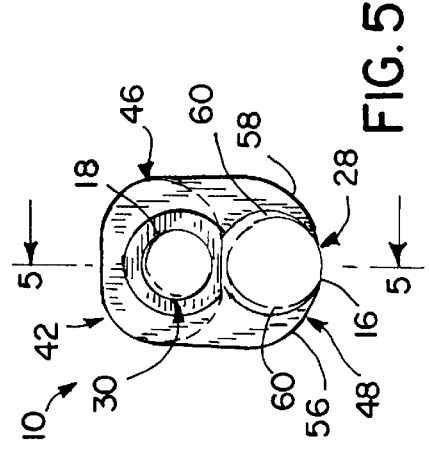

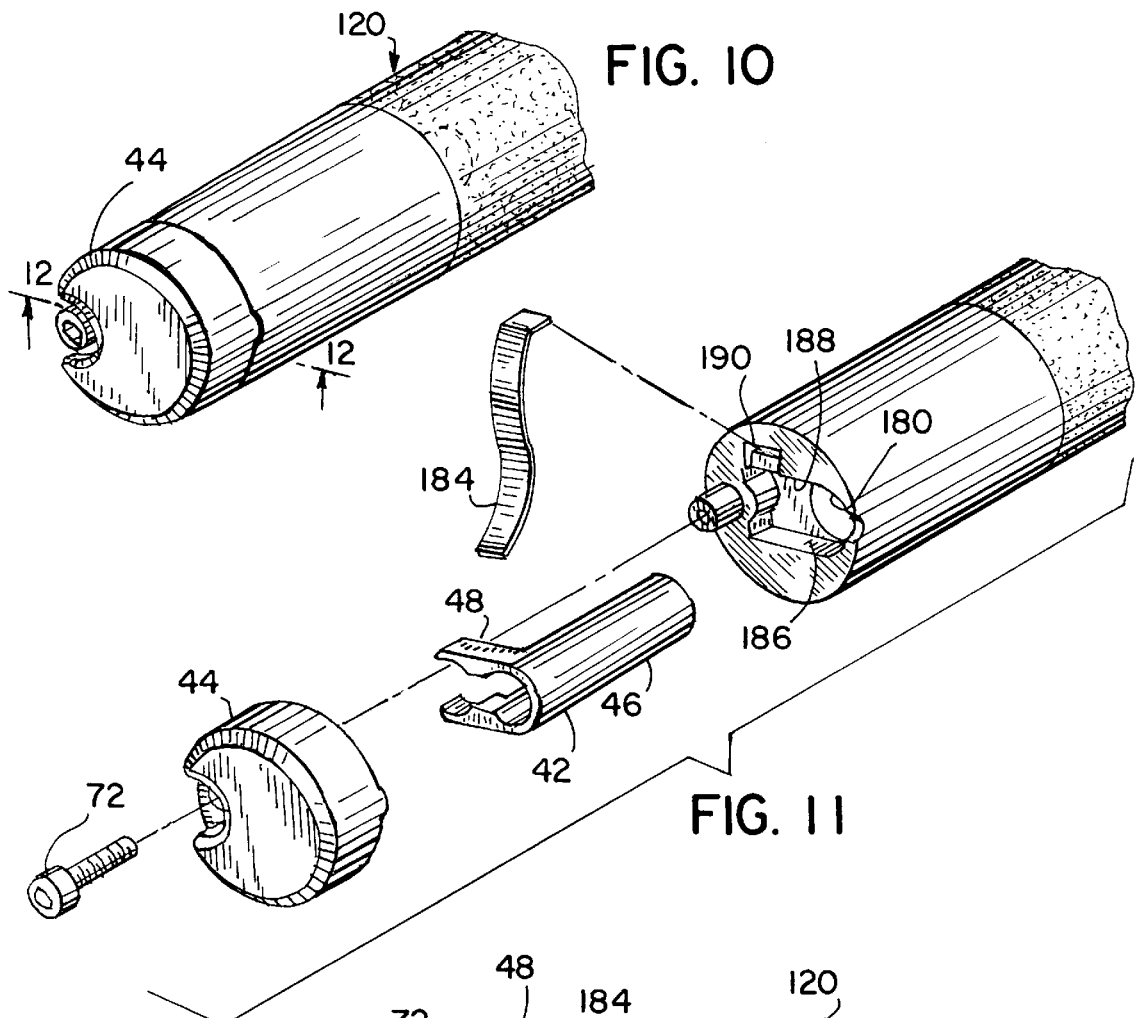
FIG. 10
FIG. 11
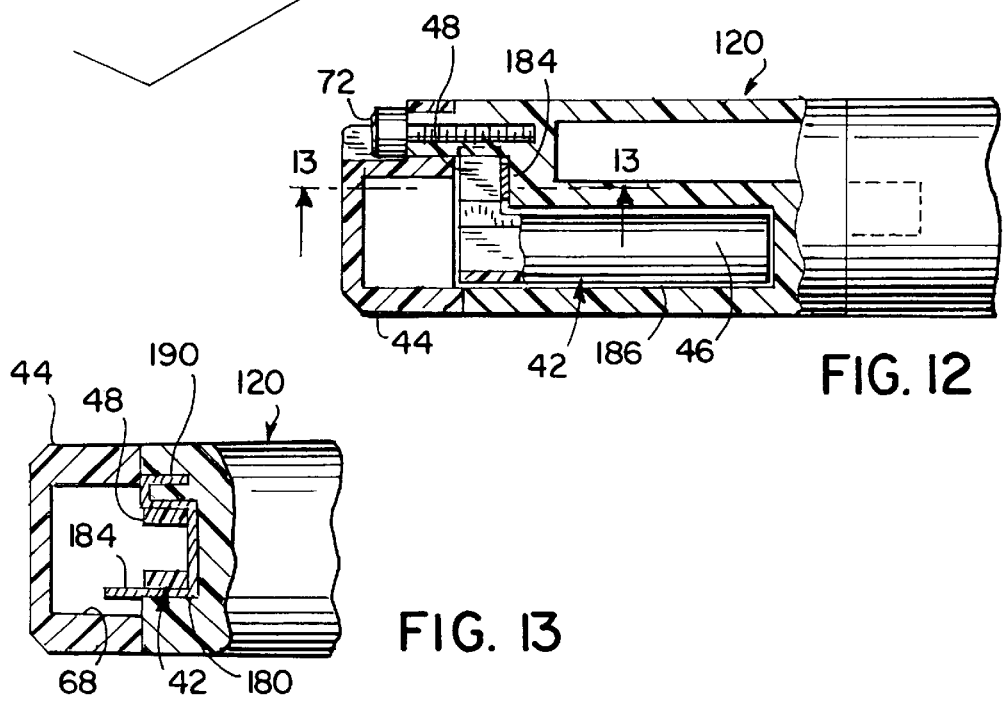
FIG. 12
FIG. 13

MULTI-SEGMENT FISHING ROD ASSEMBLY

FIELD OF THE INVENTION

The present invention relates to devices for securing the segments of a fishing rod and more specifically to securing the segments of a fully rigged fishing pole which has been broken down for transport or storage.

BACKGROUND OF THE INVENTION

Fishing rods are typically made in two segments connected by ferrules. This allows the pole to be broken down into the smaller segments for easier storage and transportation when not in use.

A problem with this method of storage is the need to remove the line and tackle from the pole before separating the segments. Failure to do so results in severe entanglement of the line and tackle with the separated segments. Because substantial time is required to detach the tackle and reel in the line before disconnecting, or to thread the line and attach the tackle after connecting the segments, the need for a device to store these segments without derigging the pole exists.

Several approaches have been suggested in the past to address this and other issues regarding fishing rod storage. Some inventors have disclosed hinged or otherwise collapsible rods, allowing the rod to have a shorter length for transportation or storage without the concerns created by separate segments. Because of the hinging or collapsing mechanisms involved, such rods are more difficult and more expensive to manufacture. Furthermore, the presence of hinges along the length of the rod is likely to result in a less firm and secure connection than the ferrules typically provided in multi-segment fishing rods. This, in turn, impair the performance of the rod and reduces the enjoyment of the user.

other references have suggested the use of clips to interconnect the ferrule ends of the rod segments. These clips typically include a pair of parallel bores which simultaneously receive both ferrule ends of the fishing rod segments. Because the bores must be specifically sized according to the diameter of the fishing rod segments, use of a particular clip is limited to a particular rod. The beading present along the length of some rods may also limit the ability of such clips to engage any rod for which it is not specifically designed. Moreover, because the clips constitute separate individual components which must be removed from the end of the ferrules during reassembly of the fishing rod segments and during use of the fishing rod, these clips require separate storage and are often misplaced and lost.

Furthermore, neither hinged rods nor previous connecting clips address the problem of some ends of the rod segments being free. The clips previously disclosed hold only one end of each segment in position, allowing substantial movement of the opposite ends. This creates the danger of entangling the line or causing damage to the rod itself.

SUMMARY OF THE INVENTION

The present invention features a fishing rod assembly including a multi-segment rod having first and second segments and a clip for securing the segments adjacent one another during storage and transportation. The first segment includes a tip while the second segment includes a handle portion having an end opposite the tip. The clip includes a first portion configured for attachment to the first segment of the rod and a pair of resiliently flexible extensions projecting from the first portion configured to grasp the second segment of the rod. In a preferred embodiment, the extensions form a C-shaped claw and are spaced apart to accommodate a variety of rod segment sizes, while the first portion is a ferrule complimentary to the ferrule portion of the first segment.

The present invention further features a handle portion preferably containing a cavity axially extending from the end towards the tip. In a preferred embodiment, the fishing rod assembly includes a connecting clip, wherein the cavity is configured to receive the clip. A ribbon is preferably attached within the cavity to facilitate removal of the clip. In an alternate form of the invention, the cavity is configured to receive small fishing items, such as hooks and tackle. It is preferable that this configuration include a ribbon attached within the cavity to facilitate removal of these items.

The present invention further features a retainer projecting from the handle portion to retain the first segment proximate the handle portion. The invention is further directed to a retainer including a cap covering the end of the handle portion and having a recess to receive the tip of the first segment. In a preferred embodiment, the cap is movably attached to the end of the handle portion and may be positioned to fix the first segment between the handle portion and a wall of the recess. The movement and positioning may be in the form of pivoting or sliding. It is preferred that the cap cover an axially-extending cavity in the handle portion configured to receive a connecting clip or other small fishing items.

BRIEF DESCRIPTION OF THE DRAWINGS

FIG. 1 is a side elevational view of a multi-segment fishing rod assembly supporting a fishing reel and fishing line.

FIG. 2 is an enlarged side elevational view illustrating the fishing rod assembly of FIG. 1 in a collapsed state with a first segment secured along and parallel to a second segment by a connecting clip.

FIG. 3 is an enlarged fragmentary perspective view illustrating the connecting clip separated from the first segment and the second segment.

FIG. 5 is a sectional view taken along lines 5—5 of FIG. 4.

FIG. 6 is an enlarged fragmentary perspective view illustrating a handle portion of the first segment including a retainer separated from a tip of the second segment.

FIG. 10 is a perspective view of an alternate embodiment of the handle portion shown in FIGS. 1 through 9.

FIG. 11 is an exploded perspective view of the handle portion shown in FIG. 10.

FIG. 12 is a sectional view of the handle portion taken along lines 12—12 of FIG. 10.

FIG. 13 is a sectional view of the handle portion taken along lines 13—13 of FIG. 12.

DETAILED DESCRIPTION OF THE PREFERRED EMBODIMENTS

Figure 4:
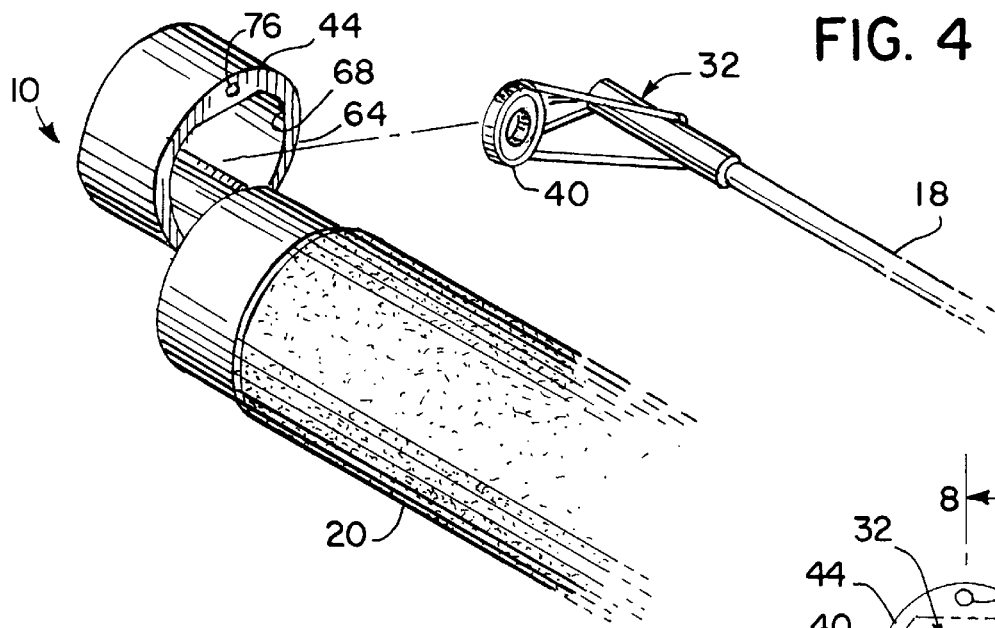
FIG. 4 is a sectional view taken along lines 4—4 of FIG. 2 illustrating the connecting clips securing an end of the first segment along and parallel to an end of the second segment.

FIG. 1 is a side elevational view of a multi-segment fishing rod assembly (10) supporting a fishing reel (12), line (14) and tackle (not shown). Fishing rod assembly (10) includes a plurality of segments, including proximal segment (16) and distal segment (18). Proximal segment (16) supports reel (12) and includes handle portion (20), line guide (22) and segment connector (24). Handle portion (20) is located at a proximal end (26) of fishing rod assembly (10) and is configured for being grasped by a user. Line guide (22) is conventionally known and comprises a circular ring through which fishing line (14) is threaded along segment (16). Segment connector (24) is located at a tip (28) of segment (16) and is configured for removably interconnecting end (28) to an adjacent segment, such as segment (18). In the preferred embodiment illustrated, segment connector (24) is a bead forming a ferrule sized for receiving end (30) of segment (18). Alternatively, segment (18) may be provided with a segment connector similar to segment (24) for interconnecting segments (16) and (18).

Segment (18) extends from segment (16) and terminates at tip (32). Segment (18) includes plurality of line guides (34), (36), (38) and (40). As conventionally known, line guides (34), (36), (38) and (40) comprise annular rings secured at spaced positions along the length of segment (18) for guiding fishing line (14) which is threaded along segment (18).

FIG. 2 is an enlarged side elevational view illustrating fishing rod assembly (10) in a collapsed state with segment (18) secured along and parallel to segment (16). As shown by FIG. 2, fishing rod assembly (10) additionally includes a connecting clip (42) releasibly securing end (28) of segment (16) along and parallel to end (30) of segment (18). Handle portion (20) of segment (16) includes a retainer (44) which releasibly secures tip (32) of segment (18) along and parallel to handle portion (20) of segment (16). Connecting clip (42) and retainer (44) enable fishing rod assembly (10) to be collapsed into a shorter, more compact arrangement for transportation or storage of fishing rod assembly (10). Connecting clip (42) and retainer (44) also enable fishing rod assembly (10) to be collapsed while still supporting reel (12) and while being rigged with fishing line (14) and tackle (not shown). Moreover, because connecting clip (42) and retainer (44) releasibly secure both tip (32) and end (30) of segment (18) along and parallel to end (28) and handle portion (20), respectively, of segment (16), segment (18) is secured in place at both ends to reduce potential entanglement and damage to segment (18). As can be appreciated, connecting clip (42) and retainer (44) may also be utilized to secure segment (18) along and parallel to segment (16) after fishing rod assembly (10) has been derigged and after reel (12) has been removed.

FIGS. 3 through 5 illustrate connecting clip (42) in greater detail. FIG. 3 is an enlarged perspective view of connecting clip (42) separated from end (28) of segment (16) and end (30) of segment (18). FIG. 4 is a sectional view taken along lines 4—4 of FIG. 2 illustrating connecting clip (42) securing end (28) of segment (16) along and parallel to end (30) of segment (18). FIG. 5 is a sectional view taken along lines 5—5 of FIG. 4 also illustrating connecting clip (42) releasibly securing and interconnecting end (28) of segment (16) along and parallel to end (30) of segment (18). As best shown by FIG. 3, connecting clip (42) includes a first portion (46) configured for attachment to segment (18) and a second portion (48) configured for attachment to segment (16). First portion (46) preferably comprises an elongated barrel defining an elongated bore (50) having a diameter greater than the diameter of end (30) of segment (18). Bore (50) is preferably sized substantially greater than end (30) so as to easily receive end (30) of segment (18) independent of variations in the diameter of end (30) of segment (18). Because bore (50) receives end (30), bore (50) also protects end (30) in addition to securing end (30) to segment (16). As shown by FIG. 5, bore (50) preferably terminates in a closed off end (52) to further protect end (30).

The second portion (48) includes a pair of a opposing parallel extensions (56) and (58) extending from first portion (46). Extensions (56) and (58) are configured and made of a material so as to be resiliently flexible to grasp end (28) of segment (16). Because extensions (56) and (58) are resiliently flexible, extensions (56) and (58) temporarily deform or flex while being positioned over and about segment (16) and then resiliently return toward their initial configuration to frictionally grasp segment (16). In the preferred embodiments illustrated, connecting clip (42) is integrally formed as a unitary body and is made from a plastic, such as acrylonitrile butadiene styrene (ABS). In the preferred embodiment illustrated, extensions (56) and (58) form a C-shaped claw. Each extension (56) and (58) includes an arcuate interior surface (60) which frictionally mates with the exterior circumferential surface of segment (16) to secure connecting clip (42) relative to segment (16) both circumferentially and axially.

Because extensions (56) and (58) form a claw having an elongated opening therebetween, extensions (56) and (58) may be easily side-ways positioned over segment (16) substantially anywhere along the length of segment (16) irregardless of surfaces, such as those of segment connector (24), which would otherwise interfere with the axial movement of end (28) through second portion (48). Alternatively, depending upon the configuration of end (28) of segment (16), end (28) may alternatively be axially slid through and between extensions (56) and (58) of second portion (48). Moreover, because extensions (56) and (58) are capable of temporarily expanding and then returning towards their initial positions, extensions (56) and (58) may be positioned at various locations along segment (16) with different diameters and may accommodate a variety of differently sized and configured segments (16). Because the interior space defined between surfaces (60) of extensions (56) and (58) is in open communication with bore (50), extensions (56) and (58) are capable of outwardly deforming a greater distance for accommodating larger diameters of segment (16).

Although connecting clip (42) is illustrated as having extensions (56) and (58) configured for grasping segment (16) while bore (50) receives end (30) of segment (18), this particular arrangement may alternatively be reversed. Moreover, in lieu of bore (50), first portion (46) may also be provided with a pair of opposing parallel, resiliently flexible extensions similar to extensions (56) and (58) for forming an open claw to grasp segment (18).

Figure 7:
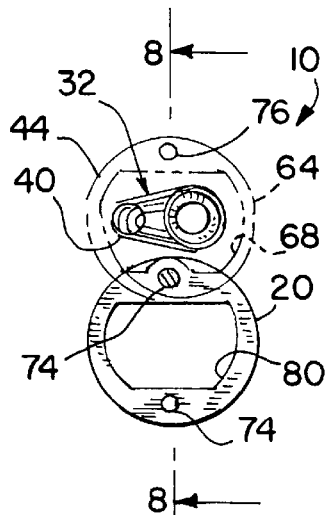
FIG. 7 is an end elevational view taken along lines 7—7 of FIG. 2 illustrating the retainer capturing the tip of the second segment adjacent to the handle portion of the first segment.

FIGS. 6 through 9 illustrate retainer (44) and handle portion (20) in greater detail. FIG. 6 is an enlarged fragmentary perspective view illustrating retainer (44) with tip (32) of segment (18) separated from retainer (44). FIG. 7 is an end elevational view taken along lines 7—7 of FIG. 2 illustrating tip (32) retaining and capturing tip (32) retainer

Figure 8:
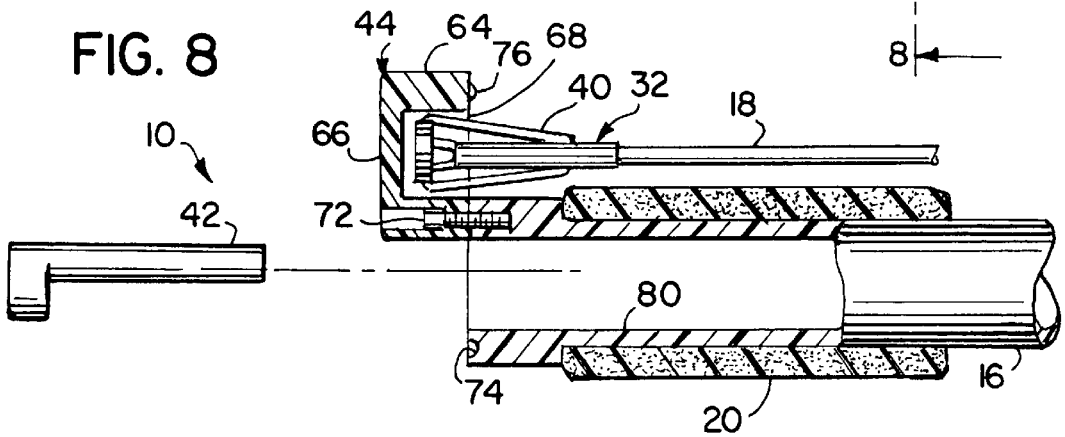
FIG. 8 is a sectional view taken along lines 8—8 of FIG. 7 illustrating the retainer and the handle portion separated from the connecting clip.
Figure 9:
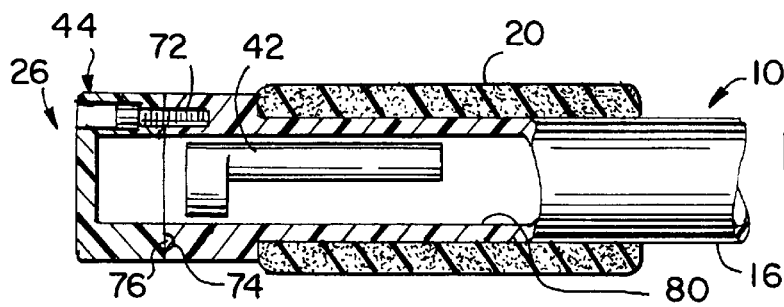
FIG. 9 is a sectional view of the handle portion illustrating the connecting clip positioned within the handle portion and the retainer positioned so as to capture the connecting clip within the handle portion.

(44) adjacent to handle portion (20). FIG. 8 is a sectional view taken along lines 8—8 of FIG. 7 illustrating retainer (44) and handle portion (20) separated from connecting clip (42). FIG. 9 is a sectional view of handle portion (20) illustrating connecting clip (42) positioned within handle portion (20) and retainer (44) positioned so as to capture connecting clip (42) within handle portion (20).

As shown by FIGS. 6 through 8, retainer (44) preferable extends from an end of handle portion (20) and is configured to secure tip (32) adjacent to handle portion (20). In the preferred embodiments illustrated, retainer (44) comprises a cap having a side-wall (64) and a bottom-wall (66) which define an interior recess (68) configured for receiving tip (32) of segment (18). In addition to retaining tip (32) adjacent and parallel to handle portion (20), retainer (44) also protects line guide (40) and tip (32) from damage or entanglement during transportation or storage of rod assembly (10). Though less desirable, retainer (44) may alternatively comprise a clip, claw, velcro strap or other retaining mechanism extending from handle portion (20) for securely retaining tip (32) adjacent to handle portion (20).

As further shown by FIGS. 8 and 9, retainer (44) preferably moves between a first position in which retainer (44) radially projects from handle portion (20) for engaging tip (32) and a second position in which retainer (44) extends coaxially with handle portion (20) to form a smooth, continuous outer circumferential surface of handle portion (20). In the preferred embodiment illustrated, retainer (44) is pivotally coupled adjacent to an end of handle portion (20) by a pin (72). Retainer (44) may alternatively be hinged or slidably coupled to handle portion (20). As shown by FIG. 9, retainer (44) is secured in the second position with complimentary detent (74) and detent engaging projection (76). Because retainer (44) moves to the second aligned position shown in FIG. 9, retainer (44) is inconspicuous and does not interfere with the grasping of handle portion (20) when fishing rod assembly (10) is being used. Moreover, because retainer (44) is moveable relative to handle portion (20), retainer (44) may be moved to enlarge or decrease the size of recess (68) projecting beyond sides of handle portion (20) depending upon the size and configuration of tip (32) of segment (18). Consequently, retainer (44) may be adjusted to accommodate and retain various sized tips (32). For example, smaller tips (32) may be captured against a handle portion (20) by pivoting retainer (44) towards the axial center line of handle portion (20).

As further shown by FIGS. 7 through 9, handle portion (20) further includes an elongate cavity (80) extending within handle portion (20). Cavity (80) axially extends from end (26) towards end (28) (Shown in FIGS. 1 and 2). Cavity (80) preferably opens adjacent to retainer (44) and is sized for receiving connecting clip (42). As shown by FIG. 9, once connecting clip (42) is inserted within cavity (80), retainer (44) may be moved to the closed position so as to capture connecting clip (42) within cavity (80). As a result, cavity receives connecting clip (42) to store connecting clip (42) and to prevent loss of connecting clip (42) when not in use. Cavity (80) may also be used for receiving and storing various other small items, such as fishing lures, hooks, and the like, for quick and easy accessibility.

FIGS. 10 through 13 illustrate handle portion (120), an alternate embodiment of handle portion (20) shown in FIGS. 1 through 9. Handle portion (120) is similar to handle portion (20) except that handle portion (20) includes opening (180) in lieu of opening (80) and additionally includes ribbon (184). for ease of illustration, those remaining elements which correspond to similar elements of handle portion (20) are numbered similarly. As shown by FIGS. 11 and 12, cavity (180) is specifically sized and configured to matingly receive connecting clip (42). In particular, in the embodiments illustrated, cavity (180) includes a first elongate portion (186) for receiving first portion (46) of connecting clip (42) and a second shallower and wider portion (188) sized for receiving the second portion (48) and the end of first portion (46) of connecting clip (42). As a result, cavity (180) prevents undesirable, excessive movement of connecting clip (42) within cavity (180) to minimize or eliminate unwanted rattling or other noise.

As further shown by FIGS. 11 through 13, handle portion (120) additionally includes a ribbon receiving slot (190) adjacent to second portion (188) of bore (180). Slot (190) axially extends into handle portion (120) and is configured for receiving an end of ribbon (184) to fixedly secure the end of ribbon (184) to handle portion (120). As shown by FIGS. 12 and 13, ribbon (184) preferably has a length sufficient so as to enable ribbon (184) to extend from slot (190) within portion (188) of cavity (180) behind portion (48) of connecting clip (42) and so as to project from cavity (180). As a result, ribbon (184) enables a user to simply grasp the second end of ribbon (184) to pull ribbon (184) completely out of cavity (180) to facilitate the removal of connecting clip (42) from cavity (180).

Overall, fishing rod assembly (10) provides a fishing rod assembly that is easy to collapse, store and transport. Because connecting clip (42) includes at least one claw, connecting clip (42) may be easily positioned side-ways over and about an adjacent fishing rod segment. Because extensions (56) and (58) are resiliently flexible, extensions (56) and (58) securely grasp the adjacent fishing rod segment and may accommodate a variety of differently sized fishing rod segments. Because retainer (44) securely retains an opposite end of segment (18) along and parallel to segment (16), segment (18) is more securely held in place and is less likely to become entangled or damaged. Retainer (44) also protects tip (32) of segment (18). Because retainer (44) moves between a tip retaining position and an aligned position with handle portion (20), retainer (44) does not interfere with the continuous, comfortable grip provided by handle portion (20). Because handle portion (20) additionally includes a cavity (80) for receiving connecting clip (42), or other fishing accessories, connecting clip (42) or the fishing accessories may be easily carried along with fishing rod assembly (10). Moreover, connecting clip (42) is less likely to become misplaced or lost. In the preferred embodiments illustrated, the cavity (180) provided by handle portion (120) eliminates rattling and enables the connecting clip to be easily withdrawn from cavity (180).

Although connecting clip (42), retainer (44) and the cavity (80), (180) of handle portions (20) and (120), have been illustrated for use in a single, multi-segment fishing rod assembly (10), each of these individual features may be used alone or in selected combinations on a wide variety of differently configured fishing rod assemblies. For example, connecting clip (42) may be utilized with multi-segment fishing rods having greater than two segments, wherein connecting clip (42) may include additional extensions for grasping additional segments. Retainer (44) may be formed as part of handle portion (20) anywhere along the length of handle portion (20) and may be configured so as to releasably connect with a segment utilizing various connecting mechanisms. Cavities (80) and (180) of handle portion (20) and (120) may be utilized with both multi-segment fishing rod assemblies or single-segment fishing rods.

Although the present invention has been described with reference to preferred embodiment, workers skilled in the art will recognize that changes may be made in form and detail without departing from the spirit and scope of the invention.

What is claimed is:

1. A fishing rod assembly comprising:
   a rod including first and second segments having a tip and a handle portion, the handle portion including an end opposite the tip and a cavity axially extending from the end towards the tip; and
   a clip configured to be repeatedly coupled to the first and second segments to secure the first and second segments along one another when the first and second segments are non-coaxial and repeatedly separated from the first and second segments when the first and second segments are coaxial, wherein the cavity is configured to receive the clip when the first and second segments are coaxial.

2. The fishing rod assembly of claim 1 including a ribbon having a length with first and second ends, wherein the first end is attached to the handle portion and wherein the length of the ribbon is sized so as to extend between the clip and the cavity with the second end of the ribbon protruding when the clip is positioned in the cavity.

3. The fishing rod assembly of claim 1 wherein the clip has a first configuration and wherein the cavity has a second opposite complimentary configuration such that the cavity matingly receives the clip to minimize movement of the clip within the cavity.

4. The fishing rod assembly of claim 1 wherein the clip includes a first portion configured for attachment to the first segment and a pair of resiliently flexible extensions extending from the first portion and defining a gap therebetween, such that the extensions grasp the second segment of the fishing rod.

5. The fishing rod assembly of claim 4 wherein the first portion includes a bore sized to receive the first segment.

6. The fishing rod assembly of claim 4 wherein the extensions form a C-shaped claw.

7. The fishing rod assembly of claim 4 wherein the extensions are spaced apart to accommodate a plurality of segment sizes.

8. The fishing rod assembly of claim 1 including a ribbon having first and second ends, wherein the first end is attached within the cavity and wherein the contents of the cavity can be removed by pulling on the second end of the ribbon.

9. The fishing rod assembly of claim 1 including a ribbon having a length with first and second ends, wherein the first end is attached to the handle portion and wherein the length of the ribbon is sized so as to extend between the clip and the cavity with the second end of the ribbon protruding when the clip positioned in the cavity.

10. A fishing rod assembly comprising:
    a multiple-segment rod including a first segment and a second segment, the first segment including a tip and the second segment including a handle portion, the handle portion including an end opposite the tip; and
    a first segment retainer projecting from the handle portion and configured to retain the first segment proximate the handle portion, wherein the retainer includes a cap covering the end of the handle portion opposite the tip and wherein the cap has a recess to receive the tip, wherein the handle portion includes a cavity axially extending from the end towards the tip and wherein the assembly includes a ribbon having first and second ends, wherein the first end is attached within the cavity and wherein the contents of the cavity can be removed by pulling on the second end of the ribbon.

11. The fishing rod assembly of claim 10 wherein the cap is movably attached to the handle portion.

12. The fishing rod assembly of claim 11 wherein the cap is pivotally attached to the handle portion.

13. The fishing rod assembly of claim 11 wherein the cap can be positioned to fix the first segment between the handle portion and a wall of the recess.

14. The fishing rod assembly of claim 10 wherein the assembly includes a clip configured to secure the first and second segments along one another.

15. The fishing rod assembly of claim 14 wherein the cavity is configured to receive the clip.

16. The fishing rod assembly of claim 14 wherein the clip includes a first portion configured for attachment to the first segment and a pair of resiliently flexible extensions extending from the first portion configured to grasp the second segment of the fishing rod.

17. The fishing rod assembly of claim 16 wherein the first portion includes a bore sized to receive the first segment.

18. The fishing rod assembly of claim 16 wherein the extensions form a C-shaped claw.

19. The fishing rod assembly of claim 16 wherein the extensions are spaced apart to accommodate a plurality of segment sizes.

* * * * *